United States Patent [19]
Wood

[11] Patent Number: 4,838,037
[45] Date of Patent: Jun. 13, 1989

[54] SOLENOID VALVE WITH SUPPLY VOLTAGE VARIATION COMPENSATION

[75] Inventor: Tony J. Wood, West Salem, Wis.

[73] Assignee: American Standard Inc., New York, N.Y.

[21] Appl. No.: 235,590

[22] Filed: Aug. 24, 1988

[51] Int. Cl.[4] .................. F25B 41/04; G05B 11/28
[52] U.S. Cl. ..................................... 62/225; 91/429; 251/129.05; 318/599
[58] Field of Search ............. 251/129.05, 129.15; 318/129, 599; 361/186; 236/46 F, 75; 91/429

[56] References Cited

U.S. PATENT DOCUMENTS

| | | | |
|---|---|---|---|
| 4,112,703 | 9/1978 | Kountz | 62/211 |
| 4,459,819 | 7/1984 | Hargraves | 62/212 |
| 4,473,784 | 9/1984 | Morez | 318/599 X |
| 4,527,399 | 7/1985 | Lord | 62/212 |
| 4,548,047 | 10/1985 | Hayashi et al. | 62/160 |
| 4,686,835 | 8/1987 | Alsenz | 62/223 |
| 4,694,228 | 9/1987 | Michaelis | 318/599 X |
| 4,697,431 | 10/1987 | Alsenz | 62/225 |

FOREIGN PATENT DOCUMENTS

82/02236 7/1982 World Int. Prop. O. ...... 251/129.05

Primary Examiner—William E. Wayner
Attorney, Agent, or Firm—William J. Beres; Robert J. Harter; David L. Polsley

[57] ABSTRACT

A solenoid valve used as an expansion valve in a refrigeration circuit has an opening that varies as a function of the pulse width of a high frequency PWM (pulse width modulated) control signal. A transistor controls the electrical current delivered to the solenoid valve. The PWM control signal rapidly cycles the transistor on and off at a constant frequency that is sufficiently high to prevent the valve from having enough time within a cycle to move between fully open and closed. As a result, the valve balances at an intermediate position determined by the relative lengths of the on and off periods of each pulse cycle. The relative on-off pulse widths, often referred to as, "duty cycle", is varied in response to a temperature sensor to control the flow of refrigerant through the refrigeration circuit. The duty cycle is also adjusted to compensate for any variations in the supploy voltage applied across the solenoid valve.

1 Claim, 2 Drawing Sheets

SOLENOID VALVE WITH SUPPLY VOLTAGE VARIATION COMPENSATION

TECHNICAL FIELD

This invention generally pertains to electric expansion valves for refrigeration circuits, and more specifically pertains to the control of such valves.

BACKGROUND OF THE INVENTION

Normally closed solenoid valves are generally considered as two-position devices, e.g., fully open when energized and fully closed when de-energized. It is possible, however, to energize a normally closed solenoid valve, and before it has time to open completely, de-energize it. Then before it has time to close again, the valve can be re-energized. By repeating this rapid energizing/de-energizing cycle, the valve can become balanced at an intermediate position between fully open and fully closed. The valve can be balanced at a more open position by increasing the time that the valve is energized with respect to the time it is de-energized.

Problems occur with such designs when the voltage applied to the valve deviates from the expected nominal voltage, as commonly occurs with unregulated power supplies. For example, if the supply voltage drops below normal, the valve will not open as quickly as expected. Thus the valve will balance at an intermediate position that is less than desired.

Voltage variations can be minimized by regulating the power supply; however, this is an expensive solution to the problem because regulating the main power source requires relatively large electrical components.

SUMMARY OF THE INVENTION

It is a primary object of the invention to overcome the problems associated with voltage variations of a power supply used in balancing a solenoid valve at an intermediate position between fully open and fully closed.

Another object of the invention is to rapidly cycle the DC power of a solenoid valve using a transistor driven by a PWM signal, and to cycle the power at a frequency that is sufficiently high to balance the valve at an intermediate position between fully open and fully closed.

Another object of the invention is to adjust the pulse width of the PWM signal driving the transistor to compensate for voltage variations in the power supply.

Yet another subject is to pulse width modulate a solenoid valve in response to temperature to regulate the flow of refrigerant through a refrigerant circuit.

These and other objects of the invention are accomplished by a novel refrigeration system that includes a compressor, a condenser, a solenoid valve, and an evaporator, all of which are connected in series to comprise a refrigeration system. A PWM (pulse width modulated) circuit generatees a PWM control signal that repeatedly interrupts the valve's electrical power. The interruptions occur at a frequency that is sufficiently high to balance the valve at an intermediate open position. The pulse width of the PWM signal is adjusted to compensate for voltage variations in the valve's electrical supply so that the degree to which the valve opens is generally independent of the voltage applied across the valve.

DESCRIPTION OF THE PREFERRED EMBODIMENT

Figure 1:
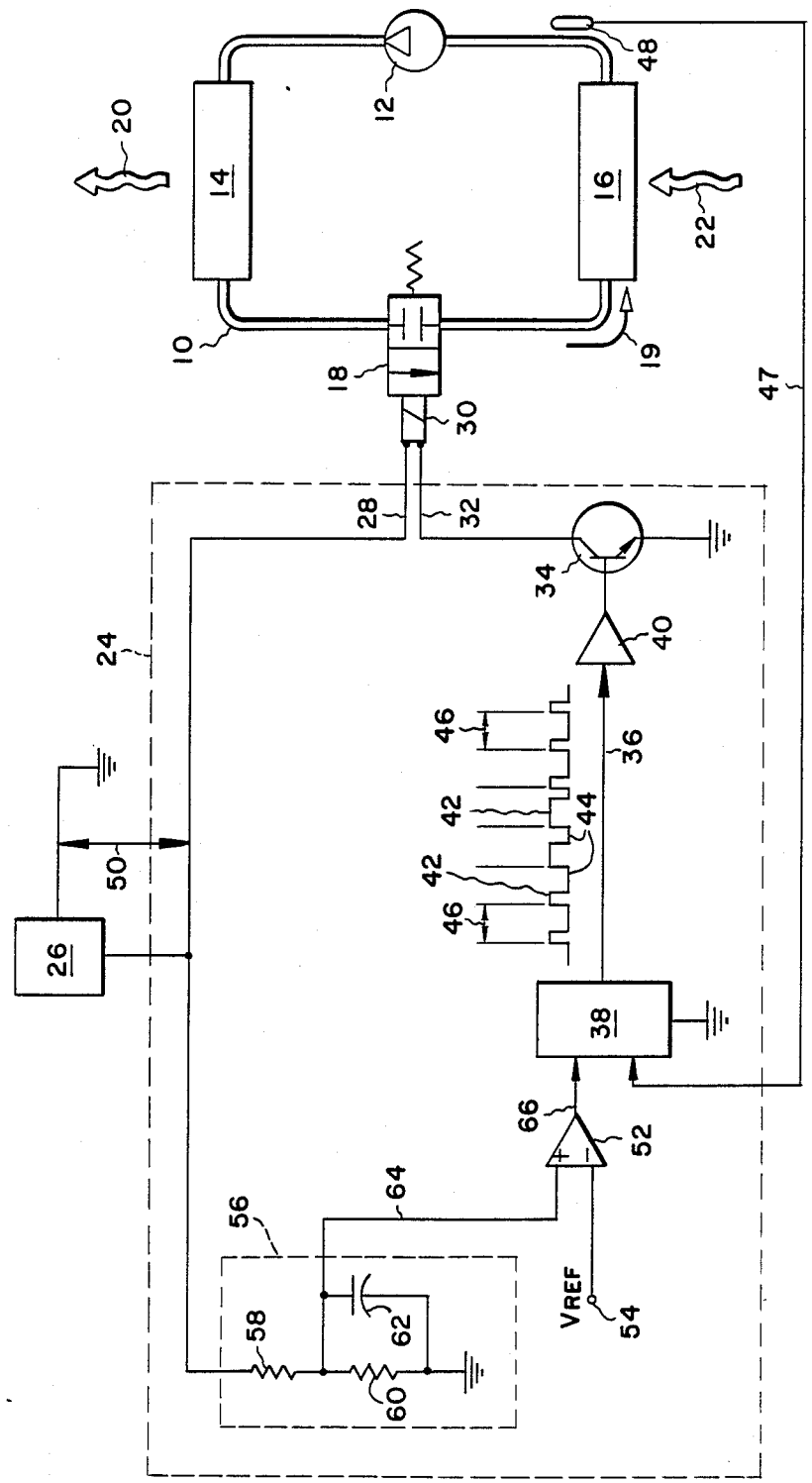
FIG. 1 shows a refrigeration system incorporating the subject invention.

A refrigeration circuit 10 incorporating the subject invention is shown in FIG. 1. Refrigeration circuit 10 includes a compressor 12, a condenser 14, and an evaporator 16, all of which are connected in series. A solenoid valve 18 is connected to refrigeration circuit 10 between condenser 14 and evaporator 16. Although valve 18 is shown as a normally closed valve, valve 18 could be any electrically operated valve, including a normally open valve.

Valve 18 serves as the refrigeration system's expansion valve. Valve 18 regulates a flow of refrigerant 19 to evaporator 16 so that the refrigeration pressure differential across valve 18 facilitates the condenser's release of heat 20 and the evaporator's absorption of heat 22.

Valve 18 (being normally closed) opens when energized and closes when de-energized under the control of a PWM circuit 24. PWM circuit 24 connects to a DC current supply 26 that delivers DC electrical current to one lead 28 of the valve's solenoid 30. The other solenoid lead 32 is connected to a transistor 34. Transistor 34 is switched on and off by a PWM control signal 36 generated by a microcomputer 38 and conveyed by a driver 40. In one embodiment of the invention, microcomputer 38 is an NEC 78C11. Transistor 34 repeatedly interrupts the DC electrical current being delivered to solenoid valve 18 at a cycle frequency that is sufficiently high to prevent valve 18 from having enough time, within a cycle, to move between fully open and closed. Although the minimum required frequency depends on the dynamics of the specific solenoid valve being used, in one embodiment of the invention, an EO-16-180C sporlan pilot operated valve was cycled at a frequency of 200 hertz. As a result of the high frequency PWM control signal 36, solenoid valve 18 balances at an intermediate position between fully open and closed. The actual degree of opening is determined by the relative lengths of the on 42 and off 44 periods of each pulse cycle 46. The relative on-off periods (duty cycle) is varied by microcomputer 38 in response to a temperature signal 47 provided by a temperature sensor 48 (associated with evaporator 16). In this way, valve 18 is controlled to regulate the flow of refrigerant 19 as a function of temperature.

In addition to varying the PWM duty cycle in response to temperature, microcomputer 38 further adjusts the duty cycle in response to the current supply's voltage level 50. Voltage 50 generally applied across solenoid valve 18 affects the speed at which valve 18 travels when energized, and thus ultimately affects the actual position at which valve 18 balances. Microcomputer 38 adjusts the duty cycle to compensate for any voltage deviations from a nominal voltage level of the current supply 26. In one embodiment of the invention, the nominal voltage level is 15 volts DC, while the actual voltage 50 can vary from 12 to 19 volts DC.

Information relating to the actual voltage level 50 of current supply 26 is provided to microcomputer 38 by a comparator 52 associated with a reference voltage 54 and an attenuating/averaging circuit 56. Attenuating- /averaging circuit 56 includes a voltage divider (resistors 58 and 60) and a capacitor 62 which function together to provide a DC signal 64 that is proportional to the average DC voltage 50 of current supply 26. Comparator 52 compares DC signal 64 to the predetermined reference voltage 54 and, in response thereto, provides microcomputer 38 with an error signal 66 representative of the current supply's voltage deviation from the current supply's nominal value. Microcomputer 38 adjusts the duty cycle of PWM signal 36 in response to error signal 66, so that the solenoid valve's degree of opening is generally independent of variations in the current supply's voltage level 50.

Figure 2:
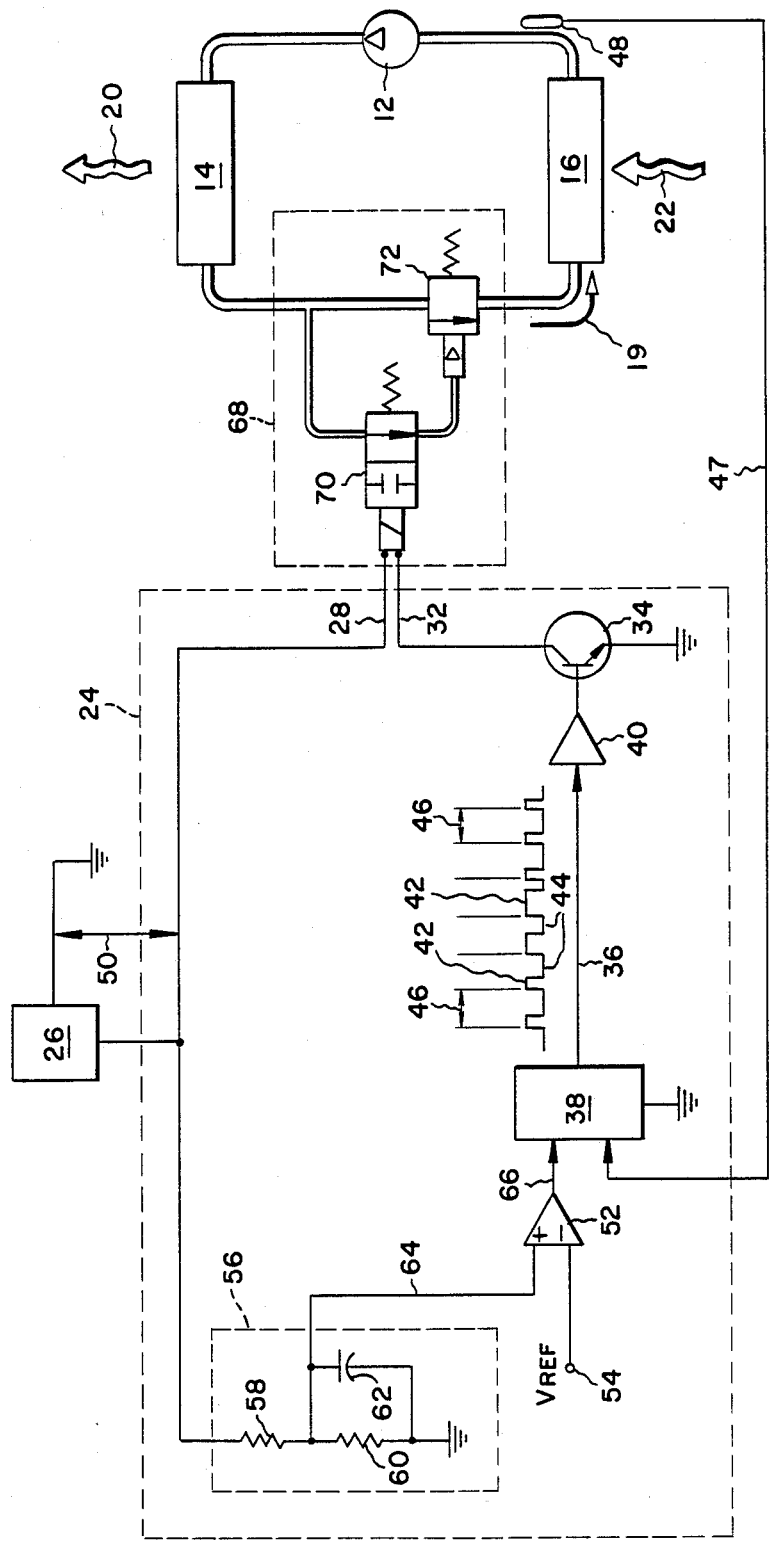
FIG. 2 shows another refrigeration system incorporating the subject invention.

With relatively large refrigeration systems, valve 18 can be replaced by a valve 68, as shown in FIG. 2. Valve 68 includes a solenoid valve 70 serving as a pilot valve controlling the variable position of a larger pressure actuated valve 72. The control of valve 70 is substantially the same as that of valve 18.

Although the invention is described with respect to a preferred embodiment, modifications thereto will be apparent to those skilled in the art. Therefore, the scope of the invention is to be determined by reference to the claims which follow.

I claim:
1. A refrigeration system comprising:
a refrigeration compressor, a condenser, and an evaporator, all of which are connected in series to comprise a refrigeration circuit;
a solenoid valve adapted to be coupled to a current supply and coupled to said refrigeration circuit by way of a pressure actuated valve connected between in series with said condenser and said evaporator, said solenoid valve being adapted to move between a fully open and a fully closed position upon receiving a DC electrical current supplied by said current supply, said pressure actuated valve having an opening that varies in response to the degree of opening of said solenoid valve, whereby said solenoid valve serves as a pilot valve for said pressure actuated valve, which in turn regulates a flow of refrigerant through said refrigeration circuit;
a PWM circuit coupled in heat transfer relationship with said refrigeration circuit by way of a temperature sensor and electrically coupled to said solenoid valve and said current supply, said PWM circuit including a microcomputer for generating a PWM control signal having a pulse width that varies in response to a temperature signal provided by said temperature sensor, said PWM control signal being communicated to a transistor that repeatedly interrupts said electrical current at a frequency that is sufficiently high to generally balance said valve at an intermediate position between said fully open and said fully closed position, said PWM circuit including a comparator that compares the voltage level of said current supply to a reference voltage to facilitate further varying of said pulse width to compensate for some variation in the voltage level of said current supply, whereby said intermediate position is generally independent of variations in the voltage level of said current supply.

* * * * *